United States Patent
Bisson

[19]

[11] Patent Number: 5,835,483
[45] Date of Patent: Nov. 10, 1998

[54] INFORMATION TRANSMISSION SYSTEM UTILIZING AT LEAST TWO CHANNELS IN THE REDUNDANCY MODE

[76] Inventor: Frédéric Bisson, Street 5, rue Gazan, 75014 Paris, France

[21] Appl. No.: 648,838

[22] Filed: May 16, 1996

[30] Foreign Application Priority Data

May 23, 1995 [FR] France ................................ 9506137

[51] Int. Cl.⁶ ................................................ H04J 3/14
[52] U.S. Cl. .................... 370/228; 371/49.1; 340/825.01
[58] Field of Search .................................. 370/216, 225, 370/227, 228; 340/825.01, 825.03, 827; 371/48, 49.1, 20.1, 68.1, 68.2, 37.7; 375/267

[56] References Cited

U.S. PATENT DOCUMENTS

| | | |
|---|---|---|
| 3,409,875 | 11/1968 | De Jager et al. . |
| 3,665,395 | 5/1972 | Bochmann . |
| 5,237,318 | 8/1993 | Auclair et al. ...................... 340/825.01 |
| 5,414,414 | 5/1995 | Suzuki ............................... 340/825.01 |
| 5,546,425 | 8/1996 | Auclair et al. ............................ 375/220 |

FOREIGN PATENT DOCUMENTS

| | | |
|---|---|---|
| 0327128 | 8/1989 | European Pat. Off. . |
| 0412320 | 2/1991 | European Pat. Off. . |
| 0454246A1 | 10/1991 | European Pat. Off. . |
| 0454249B1 | 10/1991 | European Pat. Off. .......... H04L 1/22 |

*Primary Examiner*—Chau Nguyen
*Attorney, Agent, or Firm*—Steven R. Biren

[57] ABSTRACT

A transmission system uses two channels (CHA, CHB). It includes a transmitting apparatus (1) having an input access (5) for receiving the information to be transmitted, output accesses (7A, 7B) connected to the channels for broadcasting the information to be transmitted, a first transmission delay element (8) associated to one of the accesses for delaying the information to be transmitted, a receiving apparatus (10) having accesses (11A, 11B) for receiving the information signals from the channels, a measuring circuit (15) for measuring the qualities of the various channels, and a network circuit (22) for selecting one of the channels. In the transmitting apparatus a dividing circuit (40) is provided for dividing the information to be transmitted into blocks, and an assigning circuit (42) is provided for assigning an error detection code to each of these blocks and, in the receiving apparatus (10), an error code analysis circuit (15) is provided which gives an indication of a erroneous block for the network circuit (22).

8 Claims, 5 Drawing Sheets

INFORMATION TRANSMISSION SYSTEM UTILIZING AT LEAST TWO CHANNELS IN THE REDUNDANCY MODE

FIELD OF THE INVENTION

The present invention relates to a transmission system using at least two channels in the redundancy mode, which system comprises:

a transmitting apparatus having an input access for receiving the information to be transmitted, output accesses connected to said channels for broadcasting the information to be transmitted, a first transmission delay element associated to one of said accesses the information to be transmitted, a receiving apparatus having accesses for receiving the information signals from said channels, a measuring circuit for measuring the qualities of the various channels, a network circuit for selecting one of said channels.

Such a system finds important applications in the field of telecommunications where one wishes to ensure good transmission quality by avoiding the errors and providing a certain invulnerability to disturbance.

BACKGROUND OF THE INVENTION

U.S. Pat. No. 3,409,875 describes a system of this type. According to this known technique, the delay element causing a delay T is permanently connected to one of the output accesses of a transmitting apparatus, whereas the output access of the receiving apparatus is connected to one of the channels. A quality measuring circuit analyses by comparison the signals coming from the two channels and the moment a discrepancy is signalled, the output access of the receiving apparatus is connected to the other channel which serves as a stand-by channel during a fixed period of time T. Thus, disturbance concentrated in a time interval smaller than T, which simultaneously affects the channels, is thus combatted effectively. However, this system is unsuitable when the channels cause a variable delay to occur and which delay cannot be foreseen for the signals transported by the channels, because it is no longer possible to analyze the information quality by a coincidence counter. Furthermore, this system does not eliminate the errors occurring on the stand-by channel when the latter is connected to the output access.

The present invention proposes a system of the type mentioned in the opening paragraph, which does not have this disadvantage.

SUMMARY OF THE INVENTION

Therefore, such a system is characterized in that there is provided, on the side of the transmitting apparatus, a dividing circuit for dividing the information to be transmitted into blocks, and an assigning circuit for assigning an error detection code to each of these blocks and, on the side of the receiving apparatus, an error code analysis circuit which produces an indication of erroneous blocks.

These and other aspects of the invention will be apparent from and elucidated with reference to the embodiments described hereinafter.

DESCRIPTION OF PREFERRED EMBODIMENTS

Figure 1:
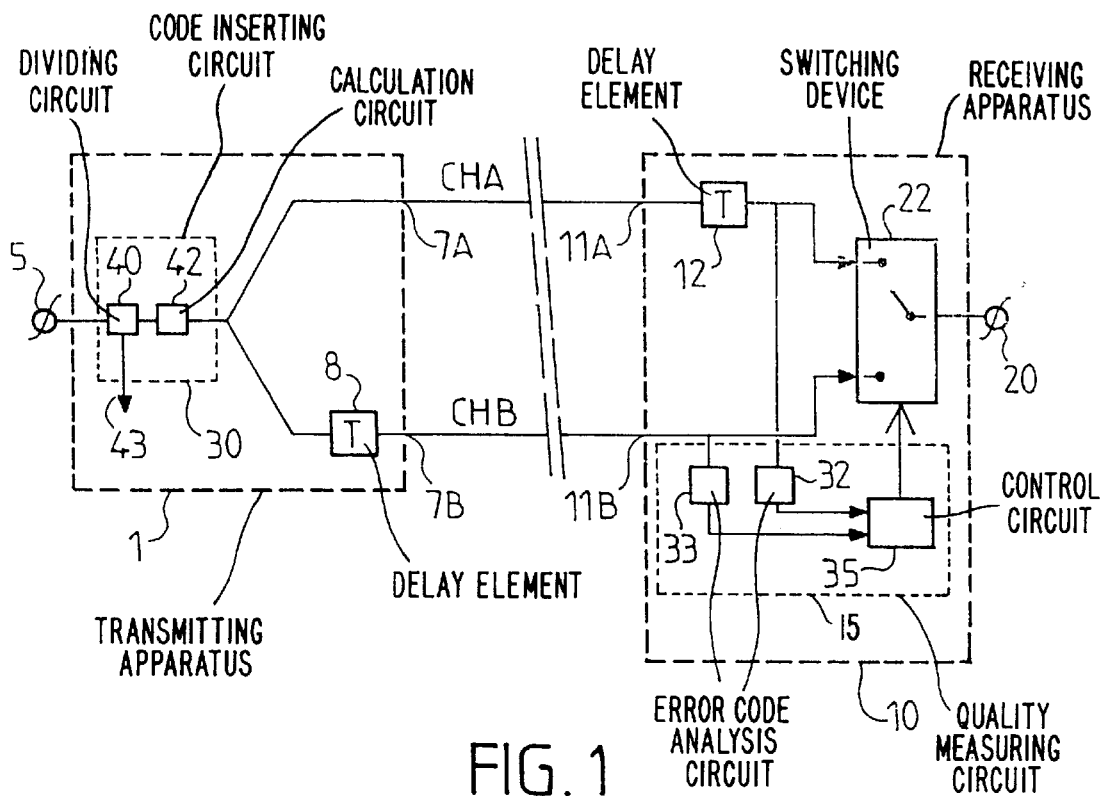
FIG. 1 shows a first embodiment of a system according to the invention.

In FIG. 1 the system according to the invention is formed by a transmitting apparatus 1 which has an access 5 for receiving the information to be transmitted, two accesses 7A and 7B for producing the same transmit information on the channels CHA and CHB. A delay element 8 inserted in the path of channel CHB delays the information streams on this channel by a period T.

The system is also formed by a receiving apparatus 10 which has accesses 11A and 11B for receiving the transmitted information coming from channels CHA and CHB. The system furthermore includes receiving delay element 12 for restoring the delay caused by the delay element 8, a quality measuring circuit 15 whose inputs receive the transmitted information streams and which determine in response to this measurement which of the channels will be connected to the output access 20. For this purpose the circuit 15 influences a switching device 22.

According to the invention, the transmission system shown in FIG. 1 comprises in the transmitting apparatus a code inserting circuit 30 for inserting the error detection code, while the quality measuring circuit 15 is formed by two error code analysis circuits 32 and 33 whose inputs receive the information streams from channels 11A and 11B. In response to the detected errors, a control circuit 35 determines, by influencing the switching circuit 22, which of the channels to be connected to the output 20. The circuit 30 is formed by a dividing circuit 40 for forming blocks on the basis of the information received on the access 5, and a calculation circuit 42 for forming a cyclic redundancy code that relates to each of the blocks created by the dividing circuit 40. A signal to indicate the beginning of a block appears on an output 43.

Figure 2:
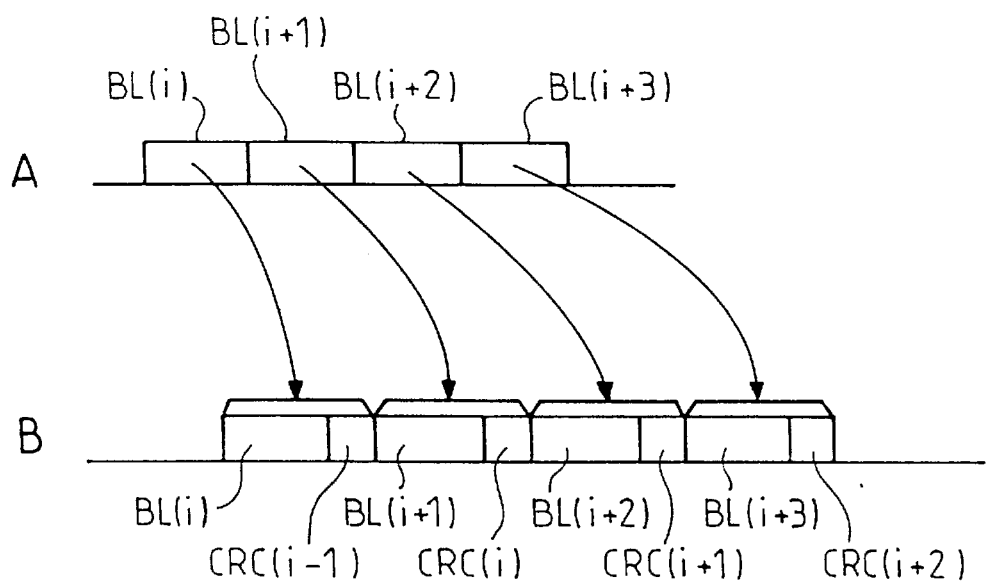
FIG. 2 shows how the information to be transmitted is organized according to a first aspect of the invention.

FIG. 2 shows how the detection code is inserted into the information streams to be transmitted and coming from the access 5. At A in this Figure is represented in a diagrammatic manner the information to be transmitted which is presented here by way of example as continuous information. The information is divided into blocks: BL(i), BL(i+1), BL(i+2), BL(i+3) . . . To each of these blocks is assigned, respectively, a cyclic redundancy code CRC(i−1), CRC(i), CRC (i+l), CRC i+2) . . . By calculating this code at the receiving end and comparing it with that which has been transmitted, the blocks containing at least one error can easily be detected.

Thus, due to this measurement according to the invention, not only the protection against disturbance in the form of pulses causing error packets on the channels CHA and CHB during a period of time shorter than the period T is ensured, but, furthermore, it is possible to determine and thus tap from the output of the receiver in a block-by-block fashion, without needless complications, the channel that transmits the errorless information.

Figure 3:
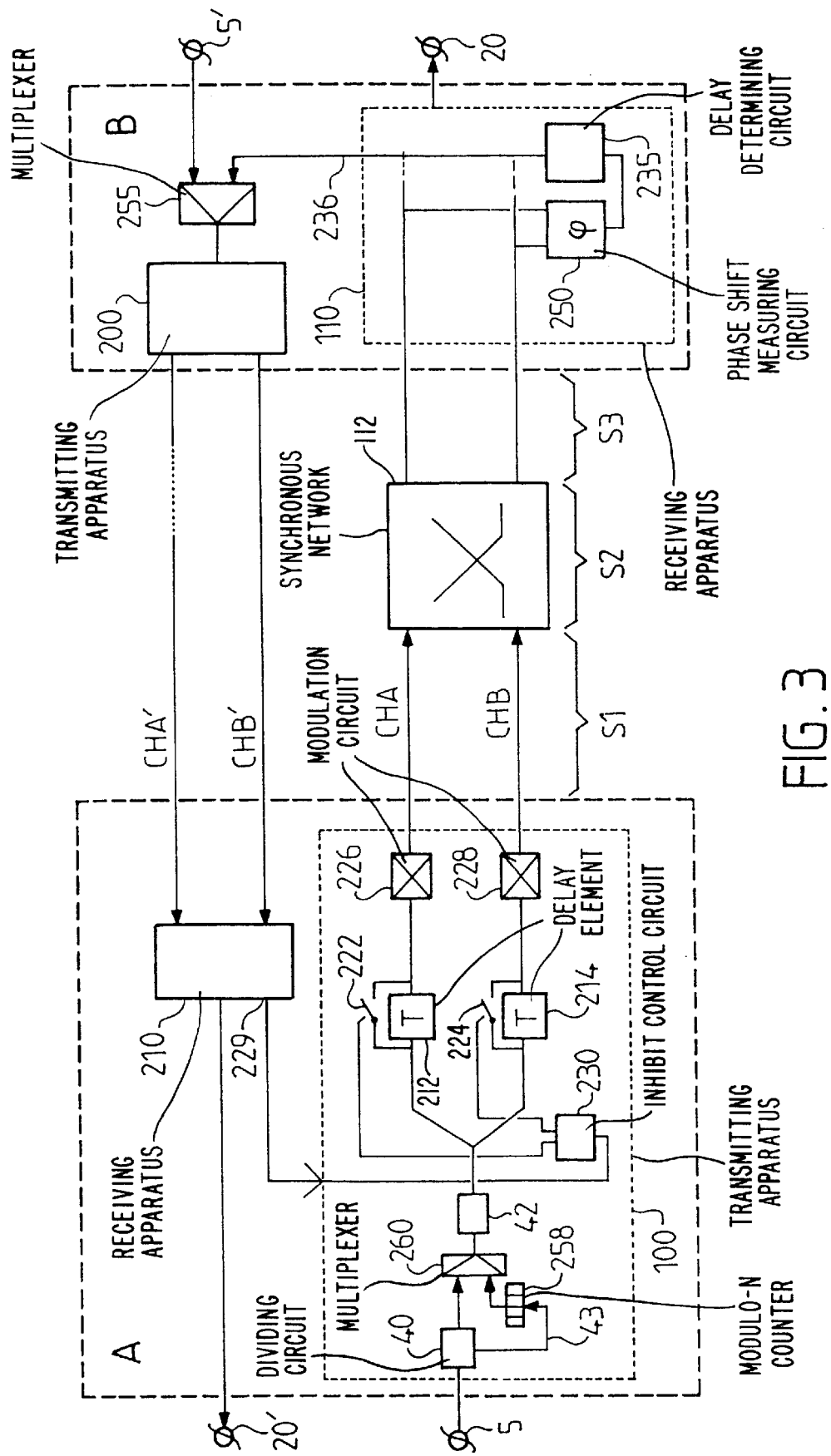
FIG. 3 shows a second embodiment preferred for a system according to the invention.

FIG. 3 shows a second system according to the invention. The elements common to those in FIG. 1 carry like reference characters. This system is formed around a two-way link which makes it possible to exchange information streams between a site A and a site B. The information streams to be transmitted from site A are applied to access 5 and those to be transmitted from site B to an access 5'. The information streams received at these sites are found back at access 20 for site B and at an access 20' for site A. These sites are connected by channels CHA and CHB for the direction going from site A to site B and by channels CHA' and CHB' for the reverse direction. Without leaving the scope of the invention, it is possible to utilize any kind of channels for transmitting information streams from site A to site B. For example, it is possible not to use channels of the same type. However, within the scope of this described example and to facilitate the explanation, all the transmitting and receiving apparatus are assumed to have identical structures.

Channels CHA and CHB connect a transmitting apparatus 100 which forms part of site A to a receiving apparatus 110 which forms part of site B. Channels CHA' and CHB' connect a second transmitting apparatus 200 of site B to a second receiving apparatus 210 of site A. It will be noted that notably the channels CHA and CHB may, in certain configurations, use a network 112 that can compensate for the desired effect that results from the use of the system of FIG. 1 This is the case, for example, for a link having a rate of 2 Mbit/s, when each channel is divided into a series of sections formed by a copper transmitter section S1 (such as a HDSL section), a transmitter section S2 which comprises the network 112 of the SDH type (such as VC12), and a second copper transmitter section S3 (HDSL). If the synchronous network 112 compensates for the delay caused by the transmitting apparatus 100 on channel CHB , as this is represented in FIG. 1, by delaying the channel CHA relative to channel CHB, the two channels can be phase aligned (or approximately) at the beginning of the second section S3. It is all the more probable that this happens as the optimum delay T and the difference of delay caused by the synchronous network, are typically of the same order of magnitude, that is to say, several milliseconds. Thus, errors caused by noise in the form of pulses in the second section S3 (HDSL) cannot be masked.

To resolve this problem, according to the invention, in the system shown in FIG. 3, delay elements 212 and 214 are arranged in the transmitting apparatus 100 and have inhibit controllers 222 and 224 respectively, represented in the form of switching circuits which short-circuit these delay elements or not. These delay elements 212, 214 are connected to the respective channels CHA and CHB via modulation circuits 226 and 228 which make a delay by these channels possible. An inhibit control circuit 230 controls these short-circuits. To effect these short-circuits, the circuit 230 is piloted by an inhibit information signal CT which is processed in the receiving apparatus 110 and which is transmitted by the return channel formed by channels CHA' and CHB'. This inhibit information signal is formed by a delay determining circuit 235, notably based on the phase shift of the information streams transmitted by channels CHA and CHB. The value of this phase shift is measured by a phase shift measuring circuit 250 whose two inputs receive said information streams transmitted by channels CHA and CHB. The delay determining circuit 235 produces on its output 236 the inhibit information signal to be sent to a multiplexer 255 which multiplexes this information with the formation to be transmitted from access 5', so that the information is transmitted via the transmitting apparatus 200 to the inhibit control circuit 230 of site A through channels CHA' and CHB'.

Figure 4:
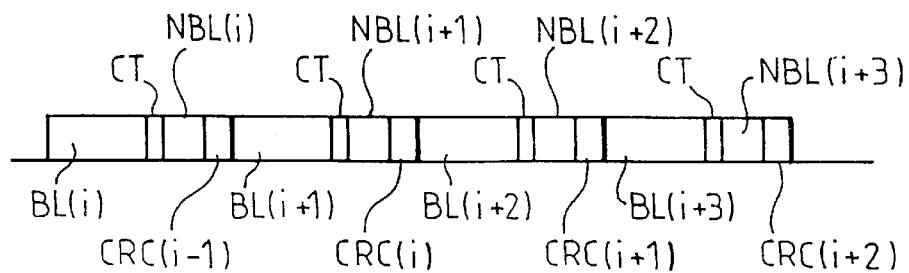
FIG. 4 shows how the information to be transmitted is organized according to this preferred embodiment.

For determining this information signal CT it is firstly necessary to measure the phase that exists between the information streams transmitted by each of the channels. Therefore, a code number NBL(i), NBL(i+1), NBL(i+2), NBL(i+3) . . . is assigned to each block processed by the divining circuit 40. These code numbers come from a modulo-N counter 258 which counts the signals on the output 43. These numbers are inserted into the information to be transmitted by a multiplexer 260. The calculation circuit 42 then calculates the error correction code or any information signal on the output of the multiplexer 260. This is shown in FIG. 4, which shows the organization of the transmission of information signals on channels CHA' and CHB'. The indicated blocks relate to the exchanges of information between the apparatus 200 and the apparatus 210 in the case of a symmetrical two-way transmission. The information signal CT may be structured differently if there is an asymmetrical transmission. The phase shift measuring circuit 250 determines this phase shift by measuring the time that separates the appearance of a like block number on the two channels CHA and CHB.

Figure 5:
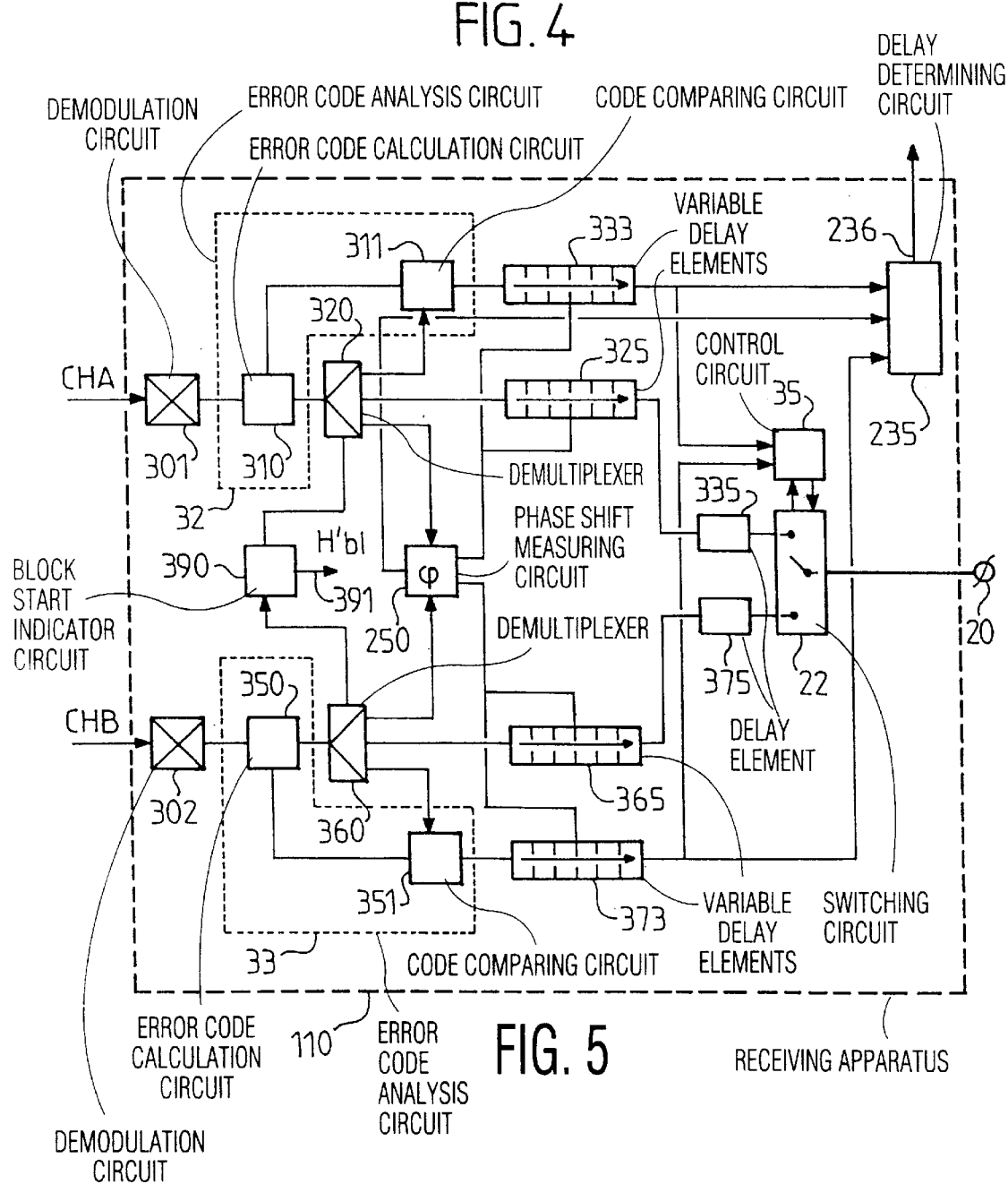
FIG. 5 shows the detail of a receiving apparatus which forms part of the system shown in FIG. 4.

FIG. 5 shows in detail the receiving apparatus 110.

Firstly it comprises two demodulation circuits 301 and 302 which perform the reverse operations to those of circuits 226, and 228 and which are assigned respectively, to channels CHA and CHB. In this FIG. 5 are shown in more detail the error code analysis circuits 32 and 33. Circuit 32 is formed by an error code calculation circuit 310 and a code comparing circuit 311 which compares codes calculated by circuit 310 with the transmitted code calculated by circuit 42 and reconstituted on the output of a demultiplexer 320. This demultiplexer 320 also applies valid data, the blocks BL(i), to a variable delay element 325 and the block numbers NBL(i) to circuit 251). The comparison information on the output of circuit 311, which determines the erroneous state or not of the blocks, is applied to a second variable delay element 333 which has the same number of cells as element 325. The information streams on the output of element 325 are systematically delayed by a delay element 335 before being applied to the switching circuit 22. The same elements are found back with respect to channel CHB. Thus elements: 350, 351, 360, 365, 373 and 375 may be compared to elements 310, 311, 320, 325, 333 and 335.

A circuit 390 produces signals H'bl indicating the beginning of a block on its output 391 in response to signals recovered in the demultiplexer 320 and 360. These signals correspond to the phase-corrected locks on the output of the elements 325 and 365. This phase correction is obtained via circuit 250 which determines the delay to be caused by the elements 325 and 365, as well as the delay to be caused by the elements 333 and 373, so that the information streams are phase-aligned at the input of the delay elements 335 and 375.

There is supposed that the delay is introduced on channel CHB. If it is noted that:

$T_A$ is the transmission time of channel CHA between the input of circuit 226 and the output of circuit 301, $T_B$ is the transmission time of channel CHB between the input of circuit 228 and the output of circuit 302, circuit 250 then determines the delay $T_1$ to be applied to elements 325 and 333 and the delay $T_2$ to be applied to elements 365 and 373, so that $T_A+T_1=T+T_B+T_2$, and $T_2$ is the smallest possible. The phase correction is possible as long as $|T+T_{-TA}| \leq N'$, where N' is equal to the integer part of N/2.

Delay elements 335 and 375 leave control circuit 35 time to determine the states of the blocks before these blocks leave said delay elements.

It is to be noted that reference may be made to the following European Patents as regards the switching problems for redundancy channels:

EP 045424 and EP 0454246.

The delay determining circuit 235 determines that delay element 212 or 214 short-circuits in response to phase shift measurements, as has already been discussed. This forms the information CT which is transmitted to the transmitting apparatus 100.

If the delayed channel, for example, CHB, which has a delay T at the transmitting apparatus 1, in the end does not have a delay of at least T compared with channel CHA, which delay is measured in circuit 250, the transmission network of section S2 compensates for the delay caused by the transmitting apparatus 1. In that case, delay determining circuit 235 sends out the command to inhibit element 214 and thus to activate element 212. If not, delay determining circuit 235 holds the command to inhibit element 214 and thus to activate element 212.

The choice of applying the delay T results from a compromise between, on the one hand, the error packets one wishes to mask and, on the other hand, the service specifications of the two-way links which in contrast, impose shortest possible transmission delays. Furthermore, the presence of impulse noise is only noticed on certain lines of the distribution network. In order to introduce a delay only in the cases where this is necessary, it would be possible during the implementation phase and link qualifying phase to proceed to measures against impulse noise. However, the cost of implementation of such measures may be prohibitive. Moreover, the noise in the form of pulses comes from an electromagnetic activity which may be manifested only during certain periods of the day. When the user's applications can eliminate occasional changes of the transmission delay, it may be desirable to apply the delay only to periods where there is impulse noise.

Figure 6:
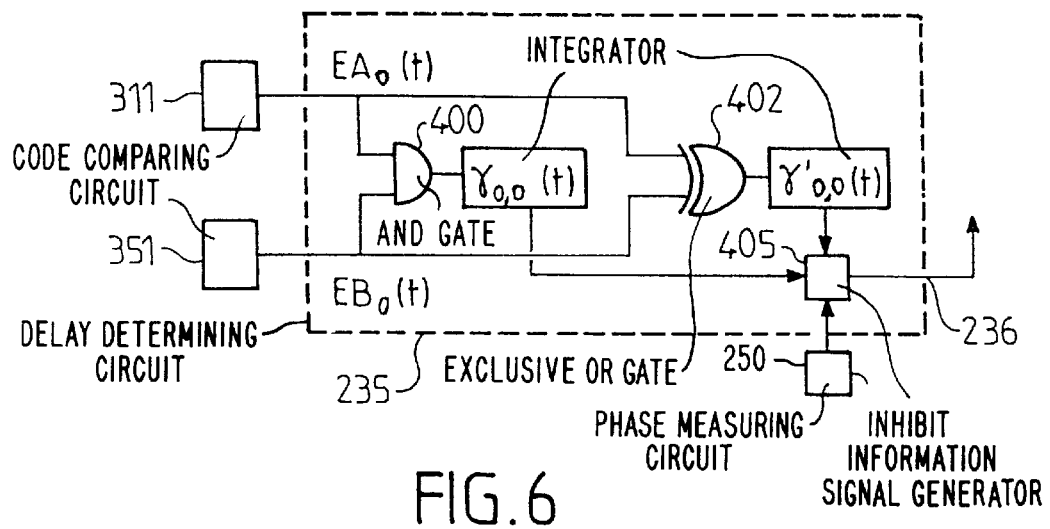
FIG. 6 shows an illustrative embodiment of a delay determining circuit which forms part of a system according to the invention.

An embodiment of a delay determining circuit 235 diagrammatically shown in FIG. 6 makes it possible to use automation for applying a delay by detections of the presence of impulse noise so that a command to activate or inhibit a delay T is sent on the appropriate channel. The presence of impulse noise is detected by comparing over an integration period Ti the proportion of simultaneously erroneous blocks with the total number of erroneous blocks, while a high proportion is an indication of the presence of impulse noise. The states of the received blocks on channel CHA, denoted EA(t), coming from circuit 311, and the states of the blocks received on channel CHB, denoted EB(t), coming from circuit 351, are used as input parameters for two integrators designated $\gamma_{0,0}(t)$ and $\gamma'_{0,0}(t)$ in FIG. 6.

$\gamma_{0,0}(t)$ counts the number of "1" resulting from the operation performed by a "LOGIC AND" gate referenced 400 and calculated on the basis of the states EA(t) and EB(t), while the rule is followed that the state of a block has the value "1" when said block is erroneous.

$\gamma'_{0,0}(t)$ uses the "EXCLUSIVE OR" function performed by a gate 402.

Thus the values given by each integrator are expressed at the instant t in the following manner:

$$\gamma_{0,0}(t) = 2 \times \int_{t-Ti}^{t} [EA(x) \cdot EB(x)] dx$$

$$\gamma'_{0,0}(t) = \int_{t-Ti}^{t} [EA(x) \oplus EB(x)] dx$$

where . represents the logic AND
$\oplus$ the EXCLUSIVE-OR
and $\gamma_{0,0}(t)$ measures the number of blocks which are simultaneously erroneous in section $S_3$.

The duration of the integration Ti is a configuration parameter of the receiver. The larger this period is, the less often the delay determining circuit 235 will activate or inhibit delay T, while the change of the value T results in an interruption of the transmission service during the period of time necessary for circuit 250 to put the two channels CHA and CHB in phase again. At instant t, the proportion Pe(t) of simultaneously erroneous blocks during Ti is produced by the result:

$$Pe(t) = \frac{\gamma_{0,0}(t)}{\gamma_{0,0}(t) + \gamma'_{0,0}(t)}$$

After an initialization phase of duration Ti, at the beginning of which the choice is made between the channel CHA or CHB on which the delay T is to be inhibited and at the beginning of which the integrators are initialized at "0", the integrators are used by the following method to decide whether to activate or inhibit the delay T: As long as the effects of impulse noise remain below a threshold Ri, the delay determining circuit 235 enforces the delay T to be 0. This condition is verified as long as Pe(t) <Ri. Ri is a configuration parameter of the receiving apparatus 110.

If the threshold Ri is exceeded, then the delay determining circuit 235 fixes the delay at the value T until Pe again becomes smaller than Ri. The method described above makes it possible to activate the delay T in optimum manner when the receiving apparatus 110 of site B is designed to have the values (Ti,Ri) which characterize the transmission performance observed by the user of the link. An identical method is suitable for the couple formed by the apparatus 200 and 210.

A statistical study of impulse noise on the lines of the telephone distribution network (cf. "Wideband impulsive noise survey of the access network"), J. W. Cook, BT Technol. Journal, Vol. 11, Nr. 3, July 1993) shows that the greater part of the error packets have a duration of less than 2 ms. For the particular case of HDSL transmission for the transport of services at 2 Mbit/s framed in accordance with Recommendation G704 of the ITU, where the duration of a block is 1 ms, the choice of the optimum delay consequently lies between 1 and 3 ms.

Figure 7:
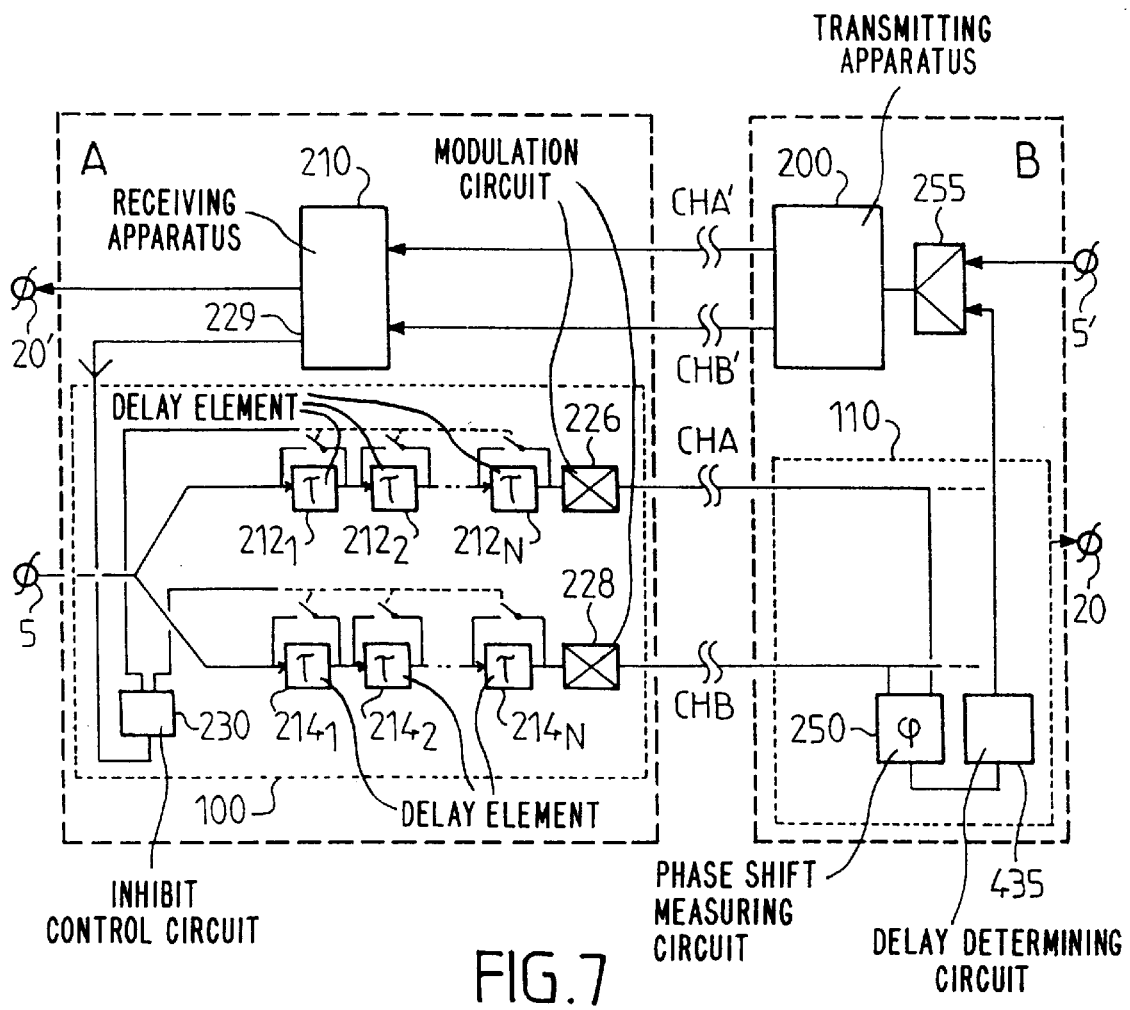
FIG. 7 shows another embodiment of a system according to the invention.

FIG. 7 shows another embodiment of a system in according to the invention in which means are provided with which it is possible to automate choosing the value of the delay to be applied at the transmitting end. In this system the delay elements 212 are formed by a cascade combination of delay elements $212_1 \ldots 212_M$ in channel CHA and element 214 by a cascade combination of delay elements $214_1 \ldots 214_M$ in channel CHB. Each of these elements causes a delay $\tau$ equal to the duration of a block. Thus, the delay caused by these elements 212 and 214 may vary from 0 to M$\tau$ in steps of $\tau$. M$\tau$ corresponds to the maximum permissible delay for the error cancelling function.

The principle consists of anticipating what would be the performance improvement obtained if the delay were diminished by the duration of 1, then 2, then 3, . . . blocks. If these anticipations do not give satisfactory results, the anticipation mechanism seeks the effect of increasing the delay by the period of time of 1, then 2, then 3 . . . blocks. The precision of the mechanism is greater as the size of the blocks of the respective frame is smaller relative to the length of the error packets. This mechanism may be realized in the following manner by the delay determining circuit 435 shown in FIG. 8 and which may be compared with the circuit 235 shown in FIG. 6. The method is implemented by a circuit 455 which notably takes into account the information streams produced by the integrators which will be described hereinafter.

Coming from the comparator 311, passing through element 333, the states of the received blocks on channel CHA, denoted $EA_k(t)$, pass through a shift register 410 which comprises M cells. Coming from the comparator 351, passing through element 373, the states of the received blocks on channel CHB, denoted $EB_k(t)$, pass through a shift register 420 of the same size as register 410. These registers are shifted in timing with the signals H'bl produced by circuit 390 (FIG. 5).

Figure 8:
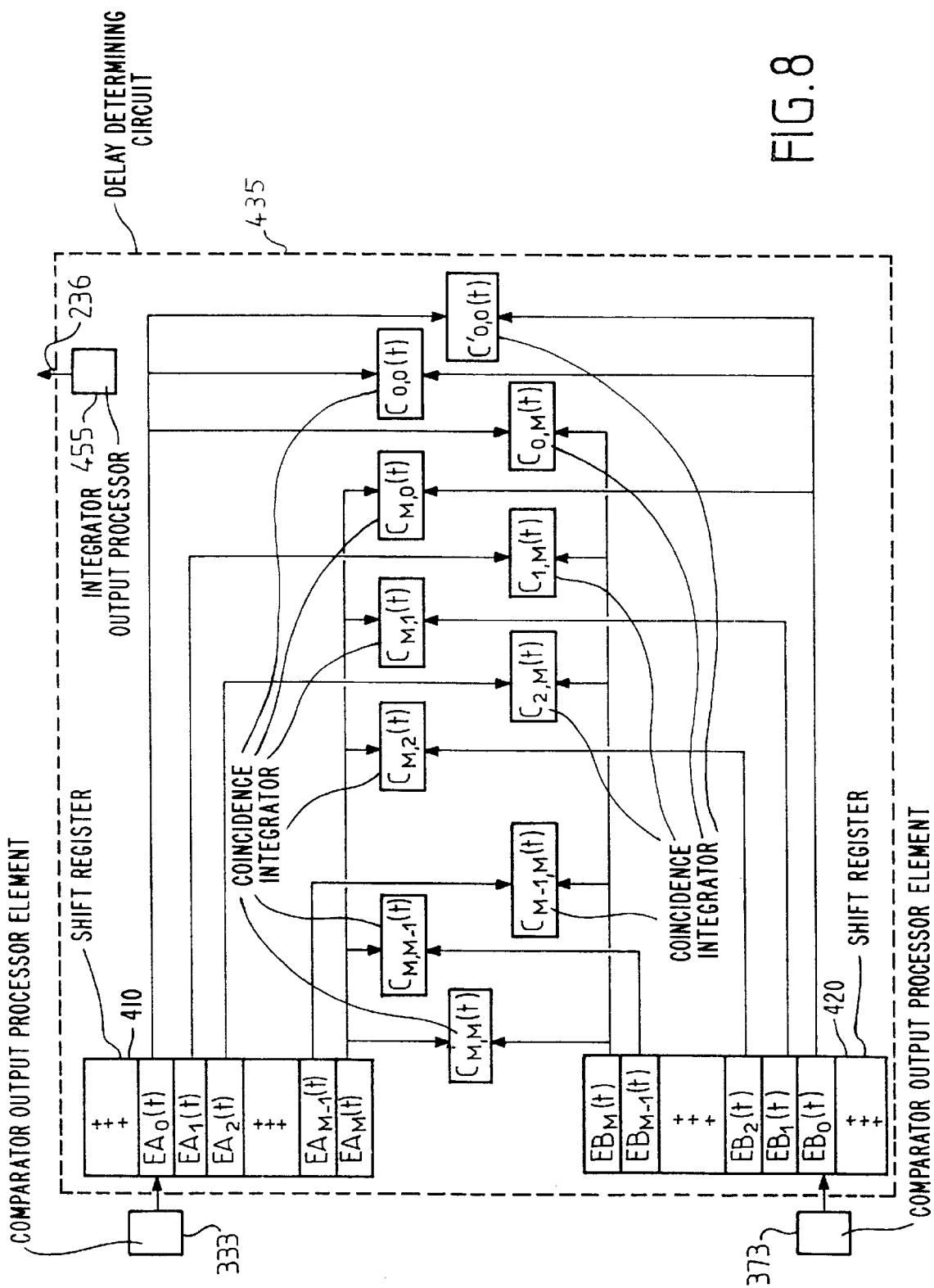
FIG. 8 shows an illustrative embodiment of a delay determining circuit which forms part of a system according to the invention represented in FIG. 7.

The values contained in the cells are used as input parameters for a series of coincidence integrators denoted $C_{k,1}(t)$ and $C'_{k,1}(t)$, represented in FIG. 8, which are expressed at instant t as:

$$C_{k,1}(t) = \int_{t-Ti}^{t} [EA_k(x) \cdot EB_1(x)] dx$$

and $$C'_{k,1}(t) = \int_{t-Ti}^{t} [EA_k(x) \oplus EB_1(x)] dx$$

The ensemble of integrators is used by the following method to determine the optimum value of the delay T that has a value mτat the instant t and which is supposed to be applied when the channel CHB is in the transmitting mode: As long as the impulse noise effects remain below the threshold Ri, the circuit 435 forces the delay T to be 0. This condition is verified if $P'_E(t)$ which, relative to $P_E(t)$, also takes the impulse noise on section S1 into account, is lower than Ri:

$$P'_E(t) = \frac{1}{2}\left[ P_E(t) + \frac{C_{M-m,M}(t)}{C_{M-m,M}(t) + C'_{M-m,M}(t)} \right]$$

if the threshold Ri is exceeded:
search for the largest integer k between 1 and m, so that $Rd.C_{M-k,M}(t) \leq C_{M,M}(t)$.
If k exists, the circuit 435 sends out the command to reduce T by the duration kτ.
If not, search for the smallest integer k between 1 and M−m, so that $Rc.C_{M,M-k}(t) \leq C_{M,M}(t)$.
Rd and Rc are configuration parameters of the receiver.
If k exists, the circuit 435 sends the command to increase T by the duration kτ.
If not, resume detecting the threshold Rd
If not, resume detecting the threshold Ri.
The method described above allows of optimal adjustment of the delay T in that the ensemble of the transmitting apparatus 100 and the receiving apparatus 110 is designed to have the values (Ti, Ri, Rd, Rc) which characterize the transmission performance observed by the user of the link. Such a method is obviously suitable for the ensemble of transmitting apparatus 200 and receiving apparatus 210.

I claim:

1. Transmission system using in the redundancy mode at least two channels, which system comprises:

a transmitting apparatus having an input access for receiving information to be transmitted, output accesses connected to said channels for broadcasting the information to be transmitted, and a first transmission delay element associated to one of said output accesses for delaying the information to be transmitted;

a receiving apparatus having input accesses for receiving the information from said channels, a measuring circuit for measuring the qualities of the various channels, and a network circuit for selecting one of said channels;

second transmission delay elements associated to the other output accesses;

delay control means associated to each of said delay elements for controlling the delay elements;

a return channel going from the receiving apparatus to the transmitting apparatus;

a delay determining circuit for piloting said delay control means by said return channel as a function of the quality measurements provided by a quality analysis circuit; and a dividing circuit, on the side of the transmitting apparatus, for dividing the information to be transmitted into blocks, an assigning circuit for assigning an error detection code to each of these blocks and, on the side of the receiving apparatus, an error code analysis circuit which produces an indication of error blocks.

2. System as claimed in claim 1, wherein the delay determining circuit further includes two integrators $\gamma_{0,0}$ and $\gamma'_{0,0}$, which integrators are used for detecting the presence of impulse noise by calculating the proportion between the number of simultaneously erroneous blocks and the total number of erroneous blocks observed over a given integration period.

3. System as claimed in claim 2, wherein the delay elements are variable and in that the delay determining circuit indicates the duration of this delay.

4. System as claimed in one of the claims 1 wherein the delay elements are variable and in that the delay determining circuit indicates the duration of this delay.

5. System as claimed in claim 4, characterized in that the analysis circuit produces performance indications and in that the delay determining circuit further includes a series of integrators $C_{k,1}$,which integrator are used for anticipating the various performance improvements for various values of the delay elements and thus for determining the optimum value of the delay to be applied.

6. System as claimed in claim 5, for which the blocks have fixed durations, characterized in that the variable delay elements vary in steps of which the value is equal to the duration of one block.

7. System as claimed in claim 4, for which the blocks have fixed durations, characterized in that the variable delay elements vary in steps of which the value is equal to the duration of one block.

8. A receiving apparatus suitable for a system as claimed in claim 1, comprising:

accesses for receiving the information from said at least two channels, a measuring circuit for measuring the quality of said at least two channels, a switching circuit for selecting at least one of said channels, an output access connected to the switching circuit for producing the transmitted information, and a delay determining circuit for piloting said delay control means by said control channel as a function of the quality measurements produced by the quality analysis circuit.

* * * * *